A. B. GRIEP.
AUTOMOBILE SPEED REGULATOR.
APPLICATION FILED JUNE 27, 1910.
981,080.
Patented Jan. 10, 1911.
2 SHEETS—SHEET 1.
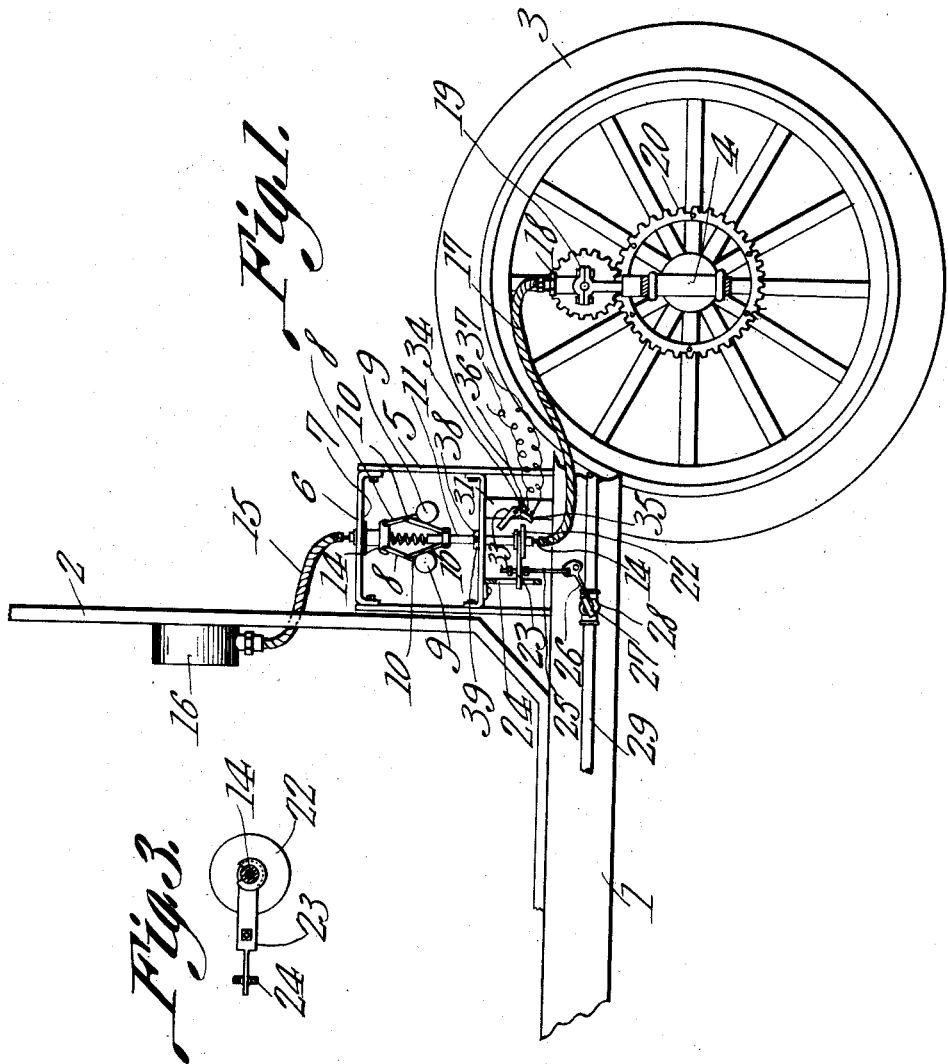
Witnesses
Anthony B. Griep,
Inventor
by C. A. Snow & Co.
Attorneys

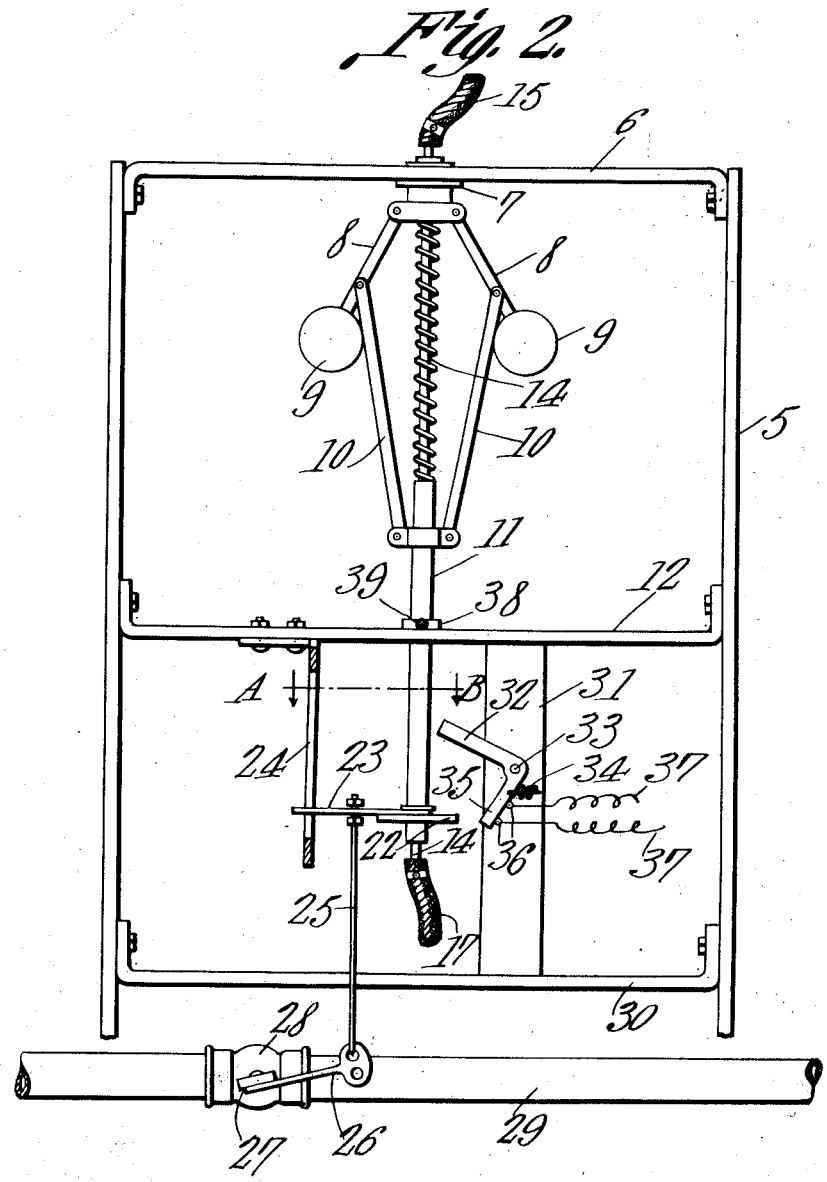

UNITED STATES PATENT OFFICE.

ANTHONY B. GRIEP, OF AURORA, MISSOURI.

AUTOMOBILE SPEED-REGULATOR.

981,080.  Specification of Letters Patent.  Patented Jan. 10, 1911.

Application filed June 27, 1910. Serial No. 569,100.

*To all whom it may concern:*

Be it known that I, ANTHONY B. GRIEP, a citizen of the United States, residing at Aurora, in the county of Lawrence and State of Missouri, have invented a new and useful Automobile Speed-Regulator, of which the following is a specification.

It is the object of this invention to provide, in a simple, merchantable and inexpensive form, a device which may be interposed into the flexible shaft which connects the speed indicator of a self-propelled vehicle with the wheel thereof, whereby the speed of the vehicle may be regulated by the same means whereby the speed indicator is actuated.

Another object of the invention is to provide novel mechanism, adapted to be operated by the traction wheel of a self-propelled vehicle, to control, automatically, the speed of the vehicle.

Another object of the invention is to provide, in a self-propelled vehicle, a governor mechanism adapted to control the supply pipe of the motor, and the sparking in the internal combustion engine whereby the vehicle is driven.

Another object of the invention is to provide governor mechanism for a self-propelled vehicle which may be employed either upon a vehicle which is driven by an internal combustion engine, or upon a vehicle which is electrically driven.

With the above and other objects in view, the invention consists in the novel construction and arrangement of parts hereinafter described, delineated in the drawings, and claimed, it being understood that, within the scope of what is claimed, divers changes may be made without departing from the spirit of the invention.

In the accompanying drawings,—Figure 1 shows the invention in side elevation, parts being broken away; Fig. 2 is a side elevation, upon an enlarged scale; and Fig. 3 is a section upon the line A—B of Fig. 2.

In the drawings, a portion of the frame of a self-propelled vehicle is shown, and denoted by the numeral 1, the numeral 2 denoting the dash-board, or other like upstanding element, the numeral 3 denoting one of the wheels of the vehicle, and the numeral 4 denoting the axle of the vehicle.

In carrying out the invention, a support is provided, this support being of any desired form, and positioned in any desired manner upon the vehicle, the location of the support upon the vehicle frame being directed by the construction of the particular vehicle upon which the same is to be employed. In the present instance, the support is shown in the form of a frame 5, supported upon the vehicle frame 1. In the upper end 6 of the frame 5, a collar 7 is mounted for rotation, diverging arms 8 being pivoted at one end to the collar 7, and at the other ends provided with balls 9. Links 10 pivotally unite the intermediate portion of the arms 8 with a tubular member 11, adapted to slide longitudinally in a cross brace 12 uniting opposite portions of the frame 5. The construction above pointed out embodies the principle of the well known fly ball governor. A shaft 14 is extended through the tubular member 11, for rotation therein, the shaft 14 being extended through the collar 7 and secured thereto, so that the collar 7 and the shaft 14 may rotate together. The shaft 14 at one end, protrudes beyond the collar 7, and is connected with a flexible shaft 15, the free end of which is operatively connected with a speed indicator 15 of any common or approved type.

The opposite end of the shaft 14 is connected with a flexible shaft 17, this flexible shaft 17 being connected by means of intermeshing pinions 18, with a pinion 20 secured to the wheel 3 of the vehicle, the intermeshing pinions 18 being mounted for rotation in a suitable bearing 19 mounted upon the axle 4. Adjacent its lower end, the tubular member 11 is provided with a head 22. This head 22 is grooved for rotation in an arm 23, the construction being such that, although the head 22 is free to rotate in the arm 23, the arm 23 will be slid to and fro with the member 11, as the same is actuated by the fly ball governor mechanism. The free end of this arm 23 is mounted for sliding movement in a slotted guide 24, one end of which is secured to the cross bar 12. One end of a connecting rod 25 is loosely mounted in the arm 23, the other end of the connecting rod being pivotally united with an extension 26, connected with the turning plug 27 of the valve 28 of the gasolene supply pipe. This gasolene supply pipe 29 forms a connection between the tank and the internal combustion engine whereby the vehicle is propelled, the construction above referred to being a matter of common knowledge, and unworthy of further illustration or description. At this point it will be stated that when the flexible shaft 15, 17, is rotated by the wheel 3 of the vehicle, the speed of the vehicle will be indicated upon the member 16. As the speed of the vehicle increases, the fly ball governor mechanism will lift the tubular member 11, the member 11 carrying with it the arm 23, and the arm 23 through the instrumentality of the connecting rod 25, operating the valve 28 in the supply pipe 29, and thus controlling automatically the speed of the vehicle. It is to be noted that the tubular member 11 is provided with a collar 38, held in place by means of a set screw 39. This collar is adapted to bear against the cross brace 12, and by adjusting the position of the collar 38 upon the member 11, the valve 28 may be so set that when the vehicle is at rest, the valve will serve to close the supply pipe 29 entirely.

If desired, a supporting plate 31 may be connected with the cross brace 12 and with one end 30 of the frame 5. A bent lever may be fulcrumed at 33, intermediate its ends upon the supporting plate 31. This supporting plate 31 may be provided with binding posts 36 or the like, adapted to receive the terminals 37 of an electric conductor. One arm 35 of the bent lever or pivotally mounted member may be held in contact with both of the binding posts by means of a retractile spring 34, one end of which is secured to the portion 35 of the lever, the other end of the spring being secured to the supporting plate 31.

It will be seen that when the speed of the vehicle has been increased to a sufficient degree, the head 22 will engage the end of the arm 32 of the bent lever, tilting the arm 35 of the lever out of engagement with the binding posts 36. Thus, the circuit through the conductor 37 will be broken. This arrangement may be employed in a variety of ways. For instance, if it is desired, it may be employed upon a vehicle which is propelled by an internal combustion engine, the sparking being thus regulated. If desired, the device last above described may be employed upon an electrically propelled vehicle, the conductor 37 in such instance, representing an electrical connection between storage battery and the motor.

Having thus described the invention, what is claimed is:—

In a device of the class described, a frame; a shaft journaled for rotation in the frame; governor mechanism operable by the shaft; a tubular member slidable and rotatable on the frame by the governor mechanism and located upon the shaft; a collar adjustably held upon the tubular member and positioned to engage the frame to limit the sliding movement of the tubular member as the speed of rotation thereof is decreased; an arm outstanding substantially at right angles to the tubular member, the tubular member being rotatable in the arm and the arm being held to the tubular member for sliding movement therewith; a guide secured to the frame substantially parallel to the shaft and adapted to receive the arm for sliding movement; a connecting element loosely engaged with the arm and adapted for connection with a fuel supply valve; a member pivotally mounted upon the frame; resilient means for tilting the pivotally mounted member to dispose the same in the path of sliding movement of the tubular member; and spaced elements adapted to receive electric conductors, the movable member being normally held by the resilient means in contact with both of said elements to complete the circuit through the conductors.

In testimony that I claim the foregoing as my own, I have hereto affixed my signature in the presence of two witnesses.

ANTHONY B. GRIEP.

Witnesses:
T. W. KELTON,
C. C. PLANK.